(12) United States Patent
Katase

(10) Patent No.: US 7,436,387 B2
(45) Date of Patent: Oct. 14, 2008

(54) ELECTROOPTICAL DEVICE UTILIZING ELECTROPHORESIS

(75) Inventor: Makoto Katase, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 352 days.

(21) Appl. No.: 10/634,884

(22) Filed: Aug. 6, 2003

(65) Prior Publication Data

US 2004/0070554 A1    Apr. 15, 2004

Related U.S. Application Data

(63) Continuation-in-part of application No. 09/822,420, filed on Apr. 2, 2001, now abandoned.

(30) Foreign Application Priority Data

Apr. 6, 2000   (JP) ............................. 2000-104972

(51) Int. Cl.
*G02F 1/01*   (2006.01)
*G02F 1/167*  (2006.01)
*G02F 1/13*   (2006.01)
*G02B 26/00*  (2006.01)

(52) U.S. Cl. .................... 345/107; 345/32; 359/237; 359/296; 359/254; 359/310; 428/321.1; 428/1.1; 204/450; 204/600; 430/57.1

(58) Field of Classification Search ............ 345/32, 345/48, 63, 67, 72, 83–85, 107–108; 359/107, 359/196, 237, 259, 244, 245, 250, 252, 254, 359/261, 296, 299, 310, 315; 428/321.1, 428/1.1–1.3, 32.15; 204/450, 600; 430/32, 430/57.1

See application file for complete search history.

(56) References Cited

U.S. PATENT DOCUMENTS

| 3,668,106 | A  |   | 6/1972  | Ota |
| 6,017,584 | A  |   | 1/2000  | Albert et al. |
| 6,072,276 | A  | * | 6/2000  | Okajima ................ 313/581 |
| 6,239,896 | B1 | * | 5/2001  | Ikeda ..................... 359/240 |
| 6,295,194 | B1 | * | 9/2001  | Sun et al. ............... 361/234 |
| 6,330,054 | B1 |   | 12/2001 | Ikami |
| 6,337,761 | B1 | * | 1/2002  | Rogers et al. .......... 359/296 |
| 6,407,763 | B1 | * | 6/2002  | Yamaguchi et al. .... 347/112 |
| 6,486,866 | B1 | * | 11/2002 | Kuwahara et al. ..... 345/107 |

(Continued)

FOREIGN PATENT DOCUMENTS

JP          49-32038          3/1974

(Continued)

OTHER PUBLICATIONS

Microcapsule-type Electrophoretis Display, published in Japan Hardcopy '99, pp. 237-240 w/Abstract.

(Continued)

*Primary Examiner*—Wesner Sajous
(74) *Attorney, Agent, or Firm*—Oliff & Berridge, PLC

(57) ABSTRACT

An electrooptical device comprises an electrooptical layer between electrodes. The electrooptical layer includes a dispersion medium and particles contained in the dispersion medium. The particles are colored a first color, while the dispersion medium is colored a second color. The first and second colors are related to each other based on a relationship of complementary colors.

13 Claims, 13 Drawing Sheets

U.S. PATENT DOCUMENTS

| | | | |
|---|---|---|---|
| 6,517,618 B2 * | 2/2003 | Foucher et al. | 106/31.16 |
| 6,611,305 B2 * | 8/2003 | Kamijo et al. | 349/112 |
| 2001/0005567 A1 | 6/2001 | Harada et al. | |
| 2001/0046010 A1 * | 11/2001 | Kamijyo et al. | 349/112 |
| 2002/0008898 A1 * | 1/2002 | Katase | 359/296 |
| 2002/0145792 A1 * | 10/2002 | Jacobson et al. | 359/296 |
| 2005/0007651 A1 * | 1/2005 | Liang et al. | 359/296 |
| 2005/0012981 A1 * | 1/2005 | Miura et al. | 359/296 |
| 2006/0038772 A1 * | 2/2006 | Amundson et al. | 345/107 |

FOREIGN PATENT DOCUMENTS

| | | |
|---|---|---|
| JP | 50-15115 | 2/1975 |
| JP | A-2000-035598 | 2/2000 |
| WO | WO 98/41899 | 9/1998 |
| WO | WO 99/53373 | 10/1999 |

OTHER PUBLICATIONS

Microcapsule-type Electrophoretic Display, published in Journal of the Imaging Society of Japan 1999, vol. 38, No. 2, pp. 51-56.

* cited by examiner

ELECTROOPTICAL DEVICE UTILIZING ELECTROPHORESIS

This is a Continuation-in-Part of application Ser. No. 09/822,420 filed Apr. 2, 2001 now abandoned. The entire disclosure of the prior application is hereby incorporated by reference herein in its entirety.

BACKGROUND OF THE INVENTION

1. Field of Technical Art

The present invention relates to electrooptical devices utilizing electrophoresis and, in particular, to electrooptical devices and electronic apparatuses capable of performing full color display with superior color reproducibility.

2. Description of Related Art

Japanese Patent publication No. 49-32038 discloses a structure that consists of a pair of sheets, a porous spacer having a large number of pores and inserted between the sheets, and dispersion filled in each pore so as to be divided into minute areas. This publication explains that each divided area of dispersion provides a cell modulated in red, green or blue and these cells are able to perform color display on the basis of the additive color process. The dispersion has a colored dispersion medium in which electrophoretic particles are dispersed. In actual production, an additive to control electrophoresis, such as a surface-active agent, is frequently included in the colored dispersion medium. However, for the sake of a simplified explanation, the explanation of the additive will be omitted. It is therefore not meant that the dispersion medium of the present invention will not include the additive such as a surface-active agent. In working of the present invention into practice, a producer can decide whether or not the additive should be included in the colored dispersion medium, in account of a material selected as the colored dispersion medium.

An electrophoretic display apparatus capable of altering, so some extent, brightness, chroma and hue has been realized so far. For example, an electrooptical device based on the electrophoresis is known, which is able to perform blue and white display using both white obtained from titanium oxide and blue obtained from a material of dye. However, practical materials of dispersion which permits given modulation required to produce color images have not been considered up to now.

BRIEF SUMMARY OF THE INVENTION

An object of the present invention is to provide an electrooptical device capable of performing display in multi-colors or the full colors.

To achieve this object, the present invention provides an electrooptical device comprising an electrooptical layer between electrodes, wherein the electrooptical layer includes a dispersion medium and particles (electrophoretic particles) contained in the dispersion medium, the particles are colored a first color and the dispersion medium is colored a second color, and the first color and the second color are related to each other based on a relationship of complementary colors. This apparatus will be referred to as a first electrooptical device.

In a preferred mode of this first electrooptical device, the first color is selected from a group including red, green and blue, and the second color is selected from a group including cyan, magenta and yellow.

The relationship between the colors of electrophoretic particles and the colors of dispersion mediums in the first electrooptical device will be exemplified as follows.

TABLE 1

| Displayed color | R (red) | G (green) | B (blue) |
|---|---|---|---|
| Colors of electrophoretic particles | R (red) | G (green) | B (blue) |
| Colors of dispersion mediums | C (cyan) | M (magenta) | Y (yellow) |

According to the first electrooptical device, using colored dispersion mediums of which colors (CMY) are complementary to the colors of electro-optic particles enables the apparatus to have high intensity of color and high contrast, with both of the color density and a cell thickness kept to their minimums. Further, since the cell can be formed into a thinner one, the intensity of an electric field required for electrophoresis can be realized by lower applied voltage than the conventional voltage. Hence the voltage to drive the cell can be lowered markedly. Further, the thinner cell makes it possible to switch the cell ON/OFF at higher speed, which leads to display of dynamic images identical or superior to or than that performed with liquid crystal display.

The present invention still provides an electrooptical device comprising an electrooptical layer between electrodes, wherein the electrooptical layer includes a dispersion medium and particles contained in the dispersion medium, and the particles are colored a first color and the dispersion medium is substantially colored black. This apparatus will be referred to as a second electrooptical device.

In the second electrooptical device, it is preferred that the first color is selected from a group including red, green and blue.

The relationship between the colors of particles and the colors of dispersion mediums in the second electrooptical device will be exemplified as follows.

TABLE 2

| Displayed color | R (red) | G (green) | B (blue) |
|---|---|---|---|
| Colors of electrophoretic particles | R (red) | G (green) | B (blue) |
| Colors of dispersion mediums | K (black) | K (black) | K (black) |

According to the second electrooptical device, using the black-colored dispersion medium enables the apparatus to have high intensity of color and high contrast, with both of the color density and a cell thickness kept to their minimums. Further, since the cell can be formed into a thinner one, the intensity of an electric field required for electrophoresis can be realized by lower applied voltage than the conventional voltage. Hence the voltage to drive the cell can be lowered markedly. Further, the thinner cell makes it possible to switch the cell ON/OFF at higher speed, which leads to display of dynamic images identical or superior to or than that performed with liquid crystal display. Coloring of the dispersion medium can be done in common regardless of the colors of the particles, which is advantageous in production cost.

The present invention still provides an electrooptical device comprising an electrooptical layer between electrodes, wherein the electrooptical layer includes a dispersion medium and particles contained in the dispersion medium, the particles are colored a first color and the dispersion medium is colored a second color, and the second color is a color to absorb the first color. This apparatus will be referred to as a third electrooptical device.

In the third electrooptical device, it is preferred that the first color is selected from a group including red, green and blue.

The relationship between the colors of particles and the colors of dispersion mediums in the third electrooptical device will be exemplified as follows.

TABLE 3

| Displayed color | R (red) | G (green) | B (blue) |
|---|---|---|---|
| Colors of electro-phoretic particles | R (red) | G (green) | B (blue) |
| Colors of dispersion mediums | Kr (red absorbed) | Kg (green absorbed) | Kb (blue absorbed) |

According to the third electrooptical device, using a colored dispersion medium that absorbs a color of electrophoretic particles enables the apparatus to have high intensity of color and high contrast, with both of the color density and a cell thickness kept to their minimums. Further, since the cell can be formed into a thinner one, the intensity of an electric field required for electrophoresis can be realized by lower applied voltage than the conventional voltage. Hence the voltage to drive the cell can be lowered markedly. Further, the thinner cell makes it possible to switch the cell ON/OFF at higher speed, which leads to display of dynamic images identical or superior to or than that performed with liquid crystal display. Limitations on coloring the dispersion medium are reduced as well, with the result that choice in materials of the dispersion medium is widened. Hence this makes it possible to improve characteristics of display.

The present invention still provides an electrooptical device comprising an electrooptical layer between electrodes, wherein the electrooptical layer has a plurality of cells each including a dispersion medium and particles contained in the dispersion medium, and the particles are colored differently from each other between the cells. This apparatus will be referred to as a fourth electrooptical device.

In the fourth electrooptical device, it is preferred to have a cell of which particles are colored red, a cell of which particles are colored green, and a cell of which particles are colored blue. In that case, the dispersion medium included in each cell may be substantially colored black, colored so as to absorb a color of the particles included in the dispersion medium of each cell, or colored so as to be complementary to the particles included in the dispersion medium of each cell.

According to the fourth electrooptical device, high intensity of color and high contrast can be obtained, with both of the color density and a cell thickness kept to their minimums. Further, voltage to drive the cell can be lowered markedly. Still, a thinner cell makes it possible to switch the cell ON/OFF at higher speed, which leads to full-color display of dynamic images identical or superior to or than that performed with liquid crystal display. Arbitrary two colors can be selected to combine with each other, thereby providing multi-color display. The fourth electrooptical device can be used in any applications as the next-generation display that exceeds CRTs and liquid crystal displays.

The present invention still provides an electrooptical device comprising an electrooptical layer between electrodes, wherein the electrooptical layer has a plurality of cells each including a dispersion medium and particles contained in the dispersion medium, and the plurality of cells form one pixel. This apparatus will be referred to as a fifth electrooptical device.

In the fifth electrooptical device, it is preferred that the particles are colored differently from each other between the cells.

According to the fifth electrooptical device, high intensity of color and high contrast can be obtained, with both of the color density and a cell thickness kept to their minimums. Further, voltage to drive the cell can be lowered markedly. Still, a thinner cell makes it possible to switch the cell ON/OFF at higher speed, which leads to full-color display of dynamic images identical or superior to or than that performed with liquid crystal display. Arbitrary two colors can be selected to combine with each other, thereby providing multi-color display. Coating microcapsules onto a flexible substrate is able to provide displays such as sheets of paper that exceed CRTs and liquid crystal displays.

The present invention is able to provide an electronic device in which the foregoing electrooptical device is incorporated as a display.

The present invention further provides an electrooptical device comprising electrodes which sandwich a plurality of micro-capsules, wherein, each of the micro-capsule contains a dispersion medium and a first particle and a second particle, the first particles are colored a first color and the second particles are colored a second color, and the first color and the second color have a relationship that one is a complementary color of the other. This apparatus will be referred to as a sixth electrooptical device.

In the sixth electrooptical device, it is preferred that the first color is selected from a group including red, green and blue, and the second color is selected from a group including cyan, magenta and yellow.

The present invention further provides an electrooptical device comprising: a cell containing a plurality of microcapsules which contains a dispersion medium, a first particle with a first color and a second particle with a second color; and electrodes which sandwich the cell; wherein the first color and the second color have a relationship that one is a complementary color of the other. This apparatus will be referred to as a seventh electrooptical device.

In the electronic device of the present invention, the employment of any one of the first to seventh electrooptical devices as a display realizes thin type of displays of which display performance is close to printed matters, which has been one ideal of electronic displays.

In the electrooptical device according to the present invention or the electronic devices using the same, the color of particles (electrophoretic particles) may be either the color of their core material or the color of their coating materiel. The present invention does not intend limiting the detailed structures and specifications of the coloring.

By way of example, iron oxide may be selected as red (R) particles, cobalt green as green (G) particles, and cobalt blue as blue (B) particles. Many other materials are also available, which are disclosed by Japanese Patent publication No. 50-15115, so details about them are omitted here.

The color of the dispersion medium may be realized by the color of its material itself or the color of dye. Alternatively, pigment that does not affect electrophoretic particles may be used as the dispersion medium. The present invention does not intend limiting the detailed structures and specifications of the coloring. By way of example, selectable is pigment having an azo group (—N=N—) or an anthraquinone structure and having a color of cyan, magenta, yellow or black.

DETAILED DESCRIPTION OF THE PREFERRED EMBODIMENTS

Referring to the accompanying drawings, the present invention will now be described.

Figure 1:
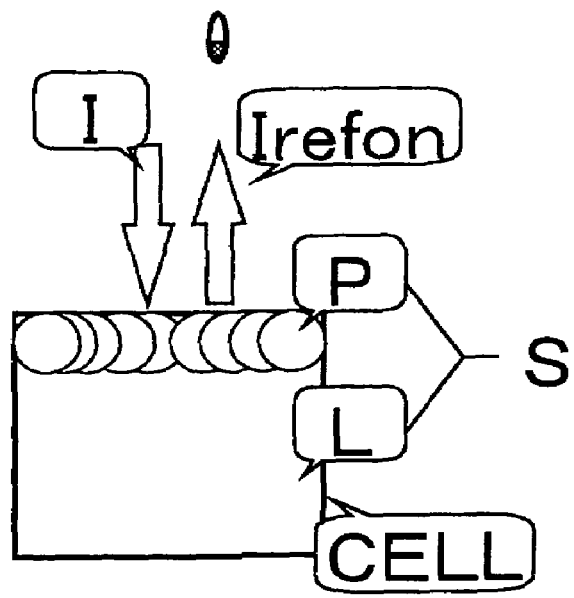
FIG. 1 is a sectional view of an electrophoretic display cell according to the present invention when displaying brightly.
Figure 2:
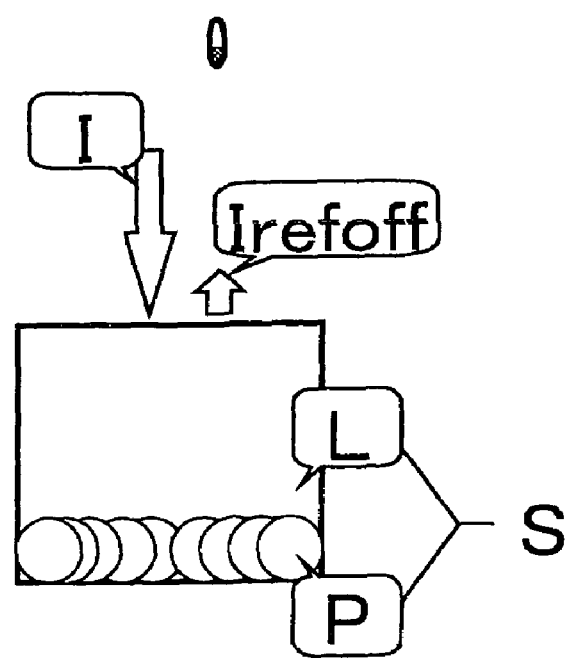
FIG. 2 is a sectional view of the electrophoretic display cell according to the present invention when displaying darkly.

FIGS. 1 and 2 are sectional views of a cell (CELL) for performing electrophoretic display. For the sake of simplified explanation, the illustration of detailed constituents, such as electrodes and a bulkhead, are omitted. In the figures, a reference P shows electrophoretic particles, a reference L shows a colored dispersion medium, and a reference S shows dispersion containing both electrophoretic particles and dispersion medium. It is frequent that an actual cell additionally uses an additive such as a surface-active agent, but this is omitted in the embodiment. As to the additive, addition or non-addition thereof is arbitrary and any type is selectable. First a fundamental operation will be explained. When applied voltage to the cell causes the electrophoretic particles P to migrate to a user-viewing-side electrode, the state shown in FIG. 1 is realized. In this case, a viewer is able to directly see the electrophoretic particles P, so that the viewer can recognize the external color of the particles P. This state is referred to as "bright" or "ON." On the other hand, when the electrophoretic particles P migrate to an opposite electrode to the user, the state shown in FIG. 2 is realized, where a viewer can recognize a certain color that has experienced the absorption of a color component through the colored dispersion medium L. This state is referred to as "dark" or "OFF." Although the cell is depicted to have a rectangular section, its shape is not limited to a rectangle, but any shape of the section can be applied to the present invention. Microcapsules described in the claims are also applied to the present invention. An intention of the present invention is combinations of colors of dispersion, which will be explained in detail.

Through incidence light used actually contains various wavelength components, a very simple model is representatively explained for the sake of description of the present invention. However, the present invention is not confined to only such a theoretical model, and it is also applied to the cell used in usual environments (outdoors during the daytime, lighted indoor environments, or others).

Incidence light consists of the three primary colors of blue (B), red (R) and green (G). Concerning the wavelength, the blue (B) is approximately 380 nm, the red (R) is approximately 780 nm, and the green (G) is approximately 520 nm, respectively. The incidence light can I can be decomposed into intensities (Ir, Ig, Ib) of the wavelengths of the three primary colors, of which decomposition is expressed by the following formula.

$$I=Ir+Ig+Ib \quad (1)$$

Reflection brightness (Irefon) for being bright (ON) is determined by the reflectance (Rr, Rg, Rb) of each color component, and expressed by the following formula.

$$Irefon=(Ir+Ig+Ib) \cdot (Rr+Rg+Rb) \quad (2)$$

In contrast, reflection brightness (Irefoff) for being dark (OFF) is determined by the reflectance of each component and the transmittance (Tr, Tg, Tb) of each dispersion medium to each color, which will be expressed by the following formula.

$$Irefoff=(Ir+Ig+Ib) \cdot (Rr+Rg+Rb) \cdot (Tr^2+Tg^2+Tb^2) \quad (3)$$

The inventor of the present invention has devised how to control each component of the R, G and B colors independently with the foregoing formulas (1), (2) and (3) kept true.

That is, the reflection brightness for being bright (ON) is understood as follows if each color is controlled independently. In the case of a cell displaying R (red), it is understood that, from the formula (2), only the reflectance Rr that reflects the component R is effective and the reflectance (Rg, Rb) of the remaining components is required to be zero or close to zero. Similarly, in the case of a cell displaying G (green), it is understood that, from the formula (2), only the reflectance Rg that reflects the component G is effective and the reflectance (Rr, Rb) of the remaining components is required to be zero or close to zero. Similarly, in the case of a cell displaying B (blue), it is understood that, from the formula (2), only the reflectance Rb that reflects the component B is effective and the reflectance (Rr, Rg) of the remaining components is required to be zero or close to zero. Elements in charge of the reflection are electrophoretic particles, and this results in the necessity that the electrophoretic particles reflect the colors R, G and B.

On the other hand, the reflection brightness for being dark (OFF) is based on the fact that incidence light is absorbed during passing a dispersion medium at a rate dependent on a colored density and a thickness of the medium. Where a cell displays R (red), it is understood that, from the formula (3), only the transmittance Tr that transmits the component R is effective but the transmittance (Tg, Tb) of the remaining components is not effective. Similarly, where a cell displays G (green), it is understood that, from the formula (3), only the transmittance Tg that transmits the component G is effective but the transmittance (Tr, Tb) of the remaining components is not effective. Similarly, where a cell displays B (blue), it is understood that, from the formula (3), only the transmittance Tb that transmits the component B is effective but the transmittance (Tr, Tg) of the remaining components is not effective. An Element to determine the transmittance is a colored dispersion medium, so that it is understood for the colored dispersion mediums that the transmittance of the colors corresponding to the electrophoretic particles of at least red (R), green (G) and blue (B) are fundamental elements to control modulation. In other words, main members for modulation are colored dispersion mediums of cyan (C), magenta (M) and yellow (Y) that are complementary colors to red (R), green (G) and blue (B), a black (K) dispersion medium capable of absorbing all the components, or colored dispersion mediums to which Kr, Kg and Kb are colored, the Kr, Kg and Kb being capable of absorbing at minimum R, G and B reflected by the electrophoretic particles.

Various embodiments of electrooptical devices according to the present invention will now be described.

A. First Embodiment

Figure 3:
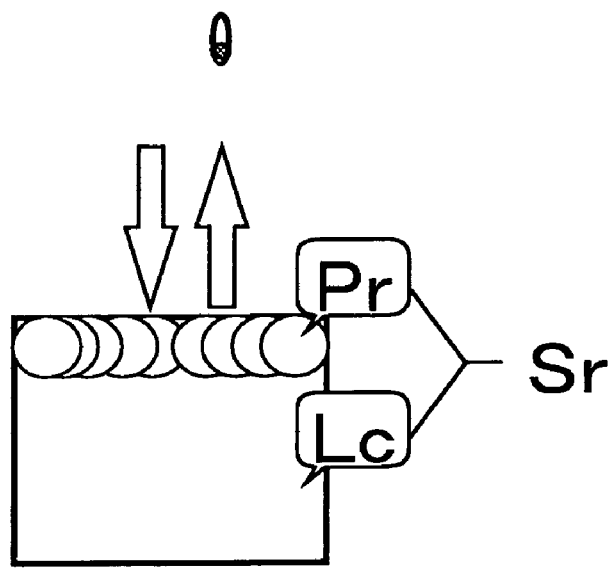
FIG. 3 is a sectional view of an electrophoretic display cell according to another embodiment of the present invention, in which red electrophoretic particles are combined with a cyan-colored dispersion medium, when displaying brightly.
Figure 4:
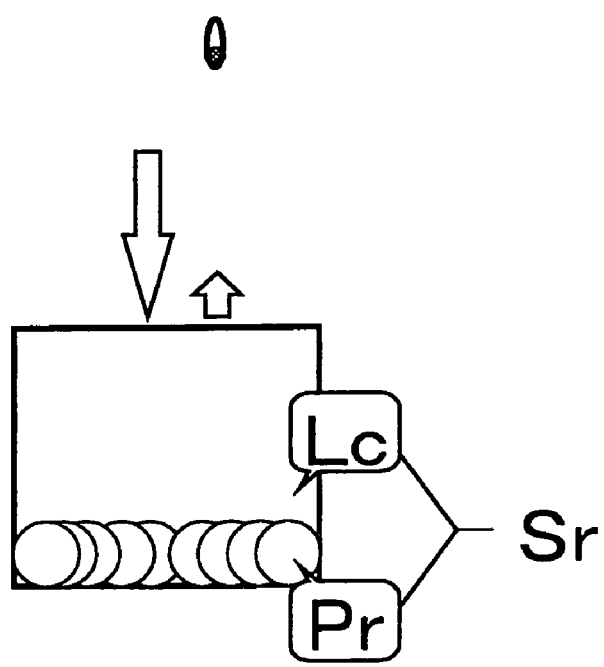
FIG. 4 is a sectional view of the electrophoretic display cell according to the embodiment of the present invention, in which red electrophoretic particles are combined with a cyan-colored dispersion medium, when displaying darkly.

FIGS. 3 and 4 show sectional views of a cell for display of red (R). Although one display panel is composed of a plurality of such cells, constituents such as electrodes and a bulkhead are omitted from being depicted for the sake of simplified explanation. Electrophoretic particles Pr have a characteristic of reflecting the component of red (R). A dispersion medium (Lc) is colored cyan (C) to absorb the wavelength component of the red (R). When applied voltage causes the electrophoretic particles Pr to migrate to an electrode located to the user side, a state shown in FIG. 3 is realized. In this case, the electrophoretic particles Pr can be seen directly by the user, where the red is displayed brightly. On the other hand, when the electrophoretic particles migrate to the electrode opposite to the user, a state shown in FIG. 4 is provided. In this situation, incidence light is subject to absorption of the colored dispersion medium (Lc), reflected by the electrophoretic particles Pr, then again subject to absorption of the colored dispersion medium (Lc), thereby a dark red or black being displayed. Although the cell is depicted to have a rectangular section, its shape is not limited to a rectangle, but any shape of the section can be applied to the present invention. An intention of the present invention is combinations of colors of dispersion.

Figure 5:
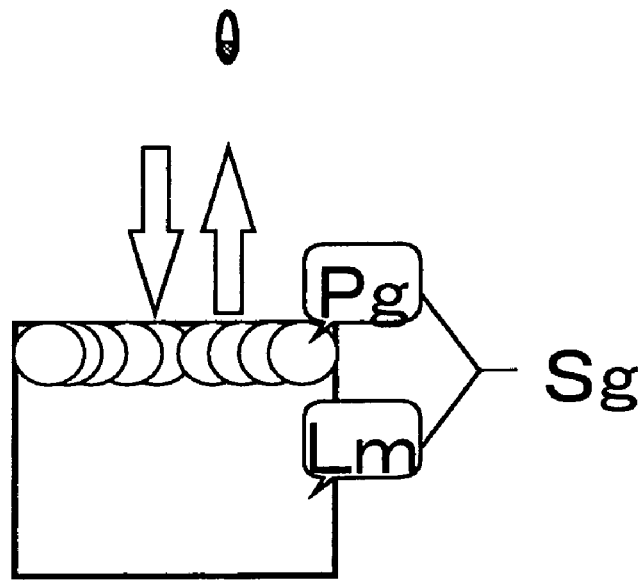
FIG. 5 is a sectional view of an electrophoretic display cell according to another embodiment of the present invention, in which green electrophoretic particles are combined with a magenta-colored dispersion medium, when displaying brightly.
Figure 6:
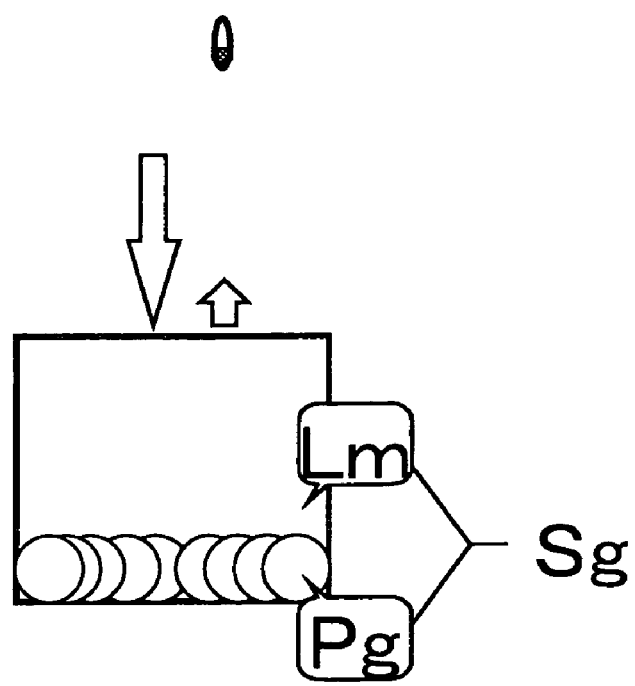
FIG. 6 is a sectional view of the electrophoretic display cell according to the embodiment of the present invention, in which green electrophoretic particles are combined with a magenta-colored dispersion medium, when displaying darkly.

FIGS. 5 and 6 show sectional views of a cell for display of green (G). For the sake of simplified explanation, constituents such as electrodes and a bulkhead are omitted from being depicted in detail. Electrophoretic particles Pg have a characteristic of reflecting the component of green (G). A dispersion medium (Lm) is colored magenta (M) to absorb the wavelength component of the green (G). When applied voltage causes the electrophoretic particles Pg to migrate to an electrode located at the user side, a state shown in FIG. 5 is realized. In this case, the electrophoretic particles Pg can be seen directly by the user, where the green is displayed brightly. On the other hand, when the electrophoretic particles migrate to the electrode opposite to the user, a state shown in FIG. 6 is provided. In this case, the cell is displayed in a dark green or black, because the incidence light experiences the absorption of the colored dispersion medium (Lm).

Figure 7:
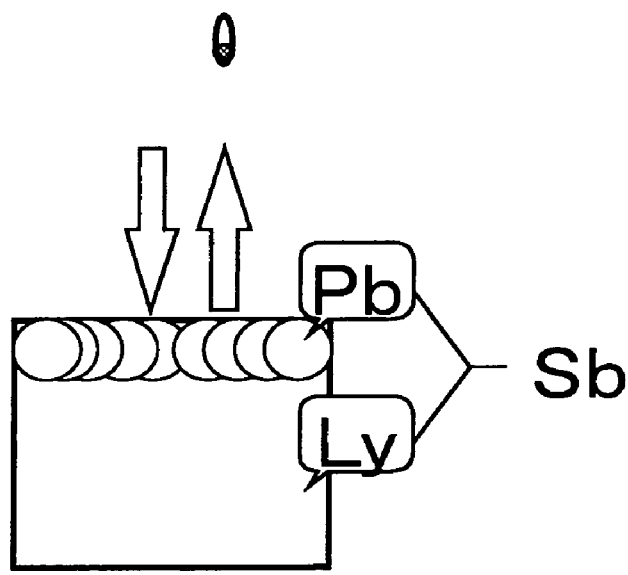
FIG. 7 is a sectional view of an electrophoretic display cell according to another embodiment of the present invention, in which blue electrophoretic particles are combined with a yellow-colored dispersion medium, when displaying brightly.
Figure 8:
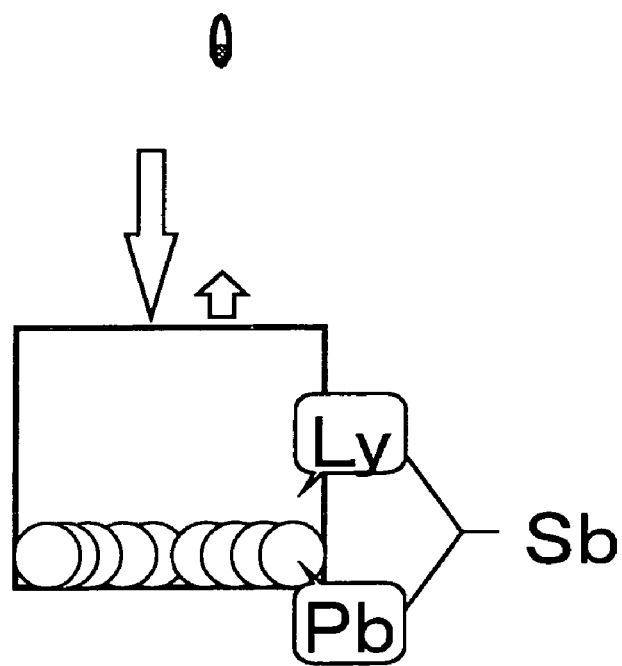
FIG. 8 is a sectional view of the electrophoretic display cell according to the embodiment of the present invention, in which blue electrophoretic particles are combined with a yellow-colored dispersion medium, when displaying darkly.

FIGS. 7 and 8 show sectional views of a cell for display of blue (B). For the sake of simplified explanation, constituents such as electrodes and a bulkhead are omitted from being depicted in detail. Electrophoretic particles Pb have a characteristic of reflecting the component of blue (B). A dispersion medium (Ly) is colored yellow (Y) to absorb the wavelength component of the blue (B). When applied voltage causes the electrophoretic particles Pb to migrate to an electrode located at the user side, a state shown in FIG. 7 is realized. In this case, the electrophoretic particles Pb can be seen directly by the user, where the blue is displayed brightly. On the other hand, when the electrophoretic particles migrate to the electrode opposite to the user, a state shown in FIG. 8 is provided. In this case, the cell is displayed in a dark blue or black, because the incidence light experiences the absorption of the colored dispersion medium (Ly).

Therefore, using both the three primary colors (RGB) of electrophoretic particles and their complementary colors (CMY) of dispersion mediums enables the cells to have high intensity of color and high contrast, with both of the color density and the cell thickness kept to their minimums. Further, since the cell can be formed into a thinner one, the intensity of an electric field required for electrophoresis can be realized by lower applied voltage than the conventional voltage. Hence the voltage to drive the cell can be lowered markedly. Further, the thinner cell makes it possible to switch the cell ON/OFF at higher speed, which leads to display of dynamic images identical or superior to or than that performed with liquid crystal display.

B. Second Embodiment

Figure 9:
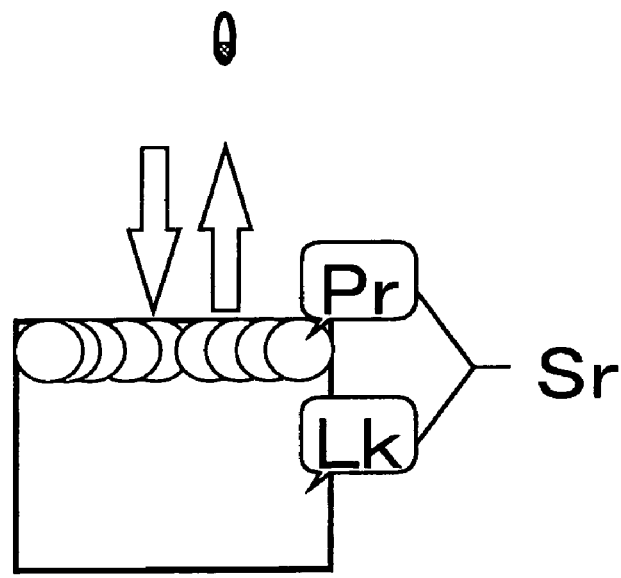
FIG. 9 is a sectional view of an electrophoretic display cell according to another embodiment of the present invention, in which red electrophoretic particles are combined with a black-colored dispersion medium, when displaying brightly.
Figure 10:
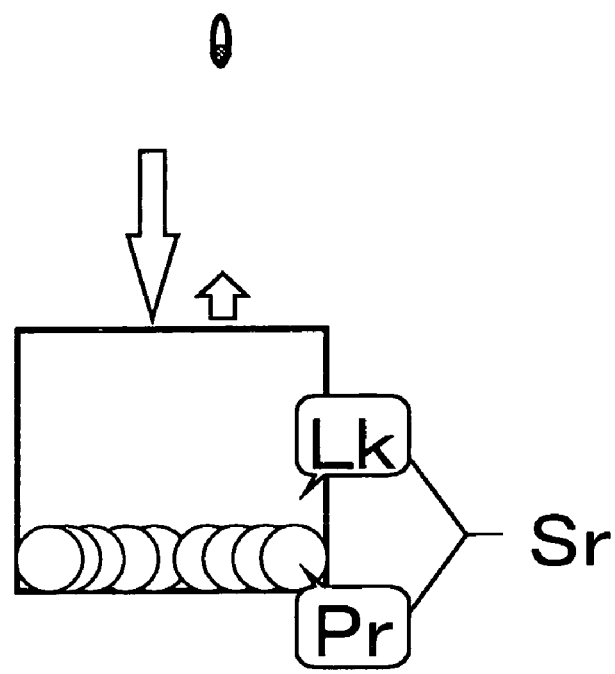
FIG. 10 is a sectional view of the electrophoretic display cell according to the embodiment of the present invention, in which red electrophoretic particles are combined with a black-colored dispersion medium, when displaying darkly.

FIGS. 9 and 10 show sectional views of a cell for display of red (R). For the sake of simplified explanation, constituents such as electrodes and a bulkhead are omitted from being depicted. Electrophoretic particles Pr have a characteristic of reflecting the component of red (R). A dispersion medium (Lk) is colored black. When applied voltage causes the electrophoretic particles Pr to migrate to an electrode located at the user side, a state shown in FIG. 9 is realized. In this case, the electrophoretic particles Pr can be seen directly by the user, where a bright red is displayed. On the other hand, when the electrophoretic particles migrate to the electrode opposite to the user, a state shown in FIG. 10 is provided. In this case, the cell is displayed in a dark red or black, because the incidence light experiences the absorption of the colored dispersion medium (Lk). Although the cell is depicted to have a rectangular section, its shape is not limited to a rectangle, but any shape of the section can be applied to the present invention. An intention of the present invention is combinations of colors of dispersion.

Figure 11:
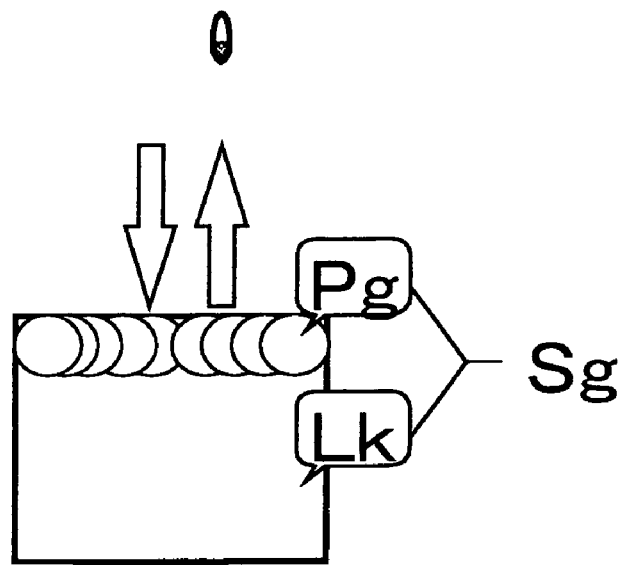
FIG. 11 is a sectional view of an electrophoretic display cell according to another embodiment of the present invention, in which green electrophoretic particles are combined with a black-colored dispersion medium, when displaying brightly.
Figure 12:
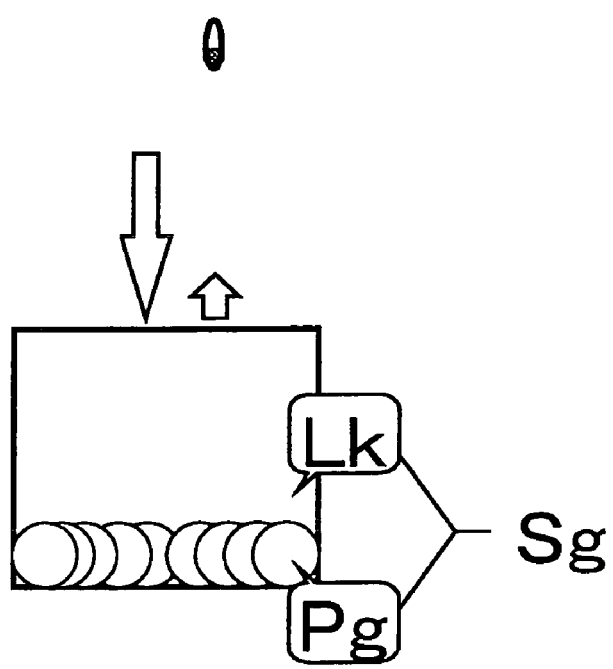
FIG. 12 is a sectional view of the electrophoretic display cell according to the embodiment of the present invention, in which green electrophoretic particles are combined with a black-colored dispersion medium, when displaying darkly.

FIGS. 11 and 12 show sectional views of a cell for display of green (G). For the sake of simplified explanation, constituents such as electrodes and a bulkhead are omitted from being depicted. When applied voltage causes electrophoretic particles Pg to migrate to an electrode located at the user side, a state shown in FIG. 11 is realized. In this case, the electrophoretic particles Pg can be seen directly by the user, where a bright green is displayed. On the other hand, when the electrophoretic particles migrate to the electrode opposite to the user, a state shown in FIG. 12 is provided. In this case, the cell is displayed in a dark green or black, because the incidence light experiences the absorption of the colored dispersion medium (Lk).

Figure 13:
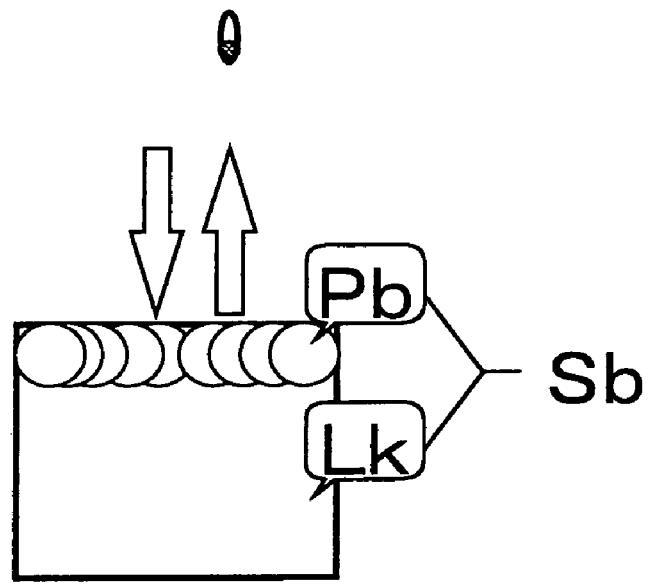
FIG. 13 is a sectional view of an electrophoretic display cell according to another embodiment of the present invention, in which blue electrophoretic particles are combined with a black-colored dispersion medium, when displaying brightly.
Figure 14:
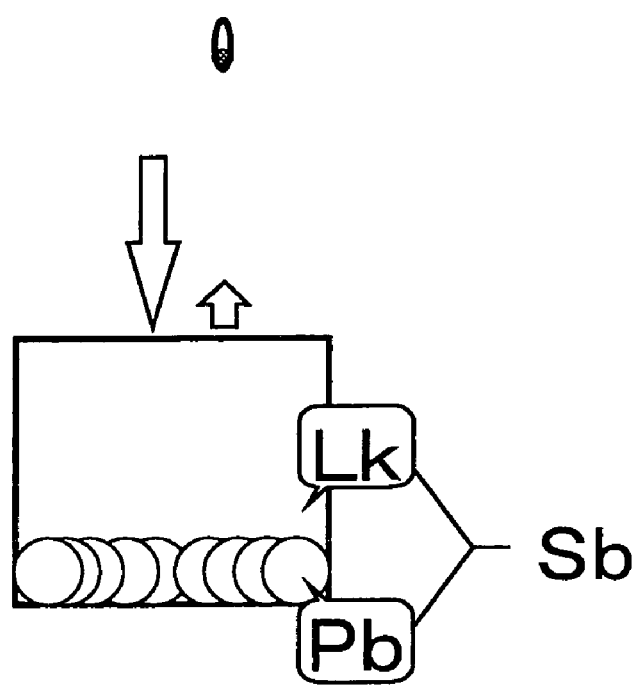
FIG. 14 is a sectional view of the electrophoretic display cell according to the embodiment of the present invention, in which blue electrophoretic particles are combined with a black-colored dispersion medium, when displaying darkly.

FIGS. 13 and 14 show sectional views of a cell for display of blue (B). For the sake of simplified explanation, constituents such as electrodes and a bulkhead are omitted from being depicted. When applied voltage causes electrophoretic particles Pb to migrate to an electrode located at the user side, a state shown in FIG. 13 is realized. In this case, the electrophoretic particles Pb can be seen directly by the user, where a bright blue is displayed. On the other hand, when the electrophoretic particles migrate to the electrode opposite to the user, a state shown in FIG. 14 is provided. In this case, the cell is displayed in a dark blue or black, because the incidence light experiences the absorption of the colored dispersion medium (Lk).

Therefore, using both the three primary colors (RGB) of electrophoretic particles and a black-colored dispersion medium enables the cells to have high intensity of color and high contrast, with both of the color density and the cell thickness kept to their minimums. Further, since the cell can be formed into a thinner one, the intensity of an electric field required for electrophoresis can be realized by lower applied voltage than the conventional voltage. Hence the voltage to drive the cell can be lowered markedly. Further, the thinner cell makes it possible to switch the cell ON/OFF at higher speed, which leads to display of dynamic images identical or superior to or than that performed with liquid crystal display.

C. Third Embodiment

Figure 15:
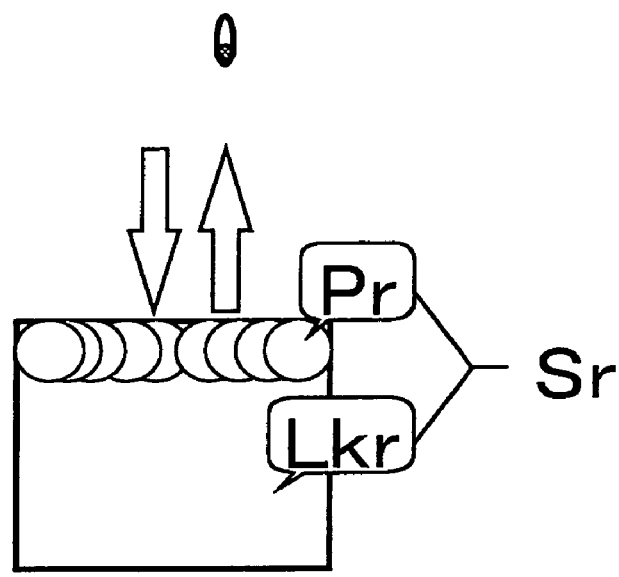
FIG. 15 is a sectional view of an electrophoretic display cell according to another embodiment of the present invention, in which red electrophoretic particles are combined with a colored dispersion medium made so as to absorb at least a component of red, when displaying brightly.
Figure 16:
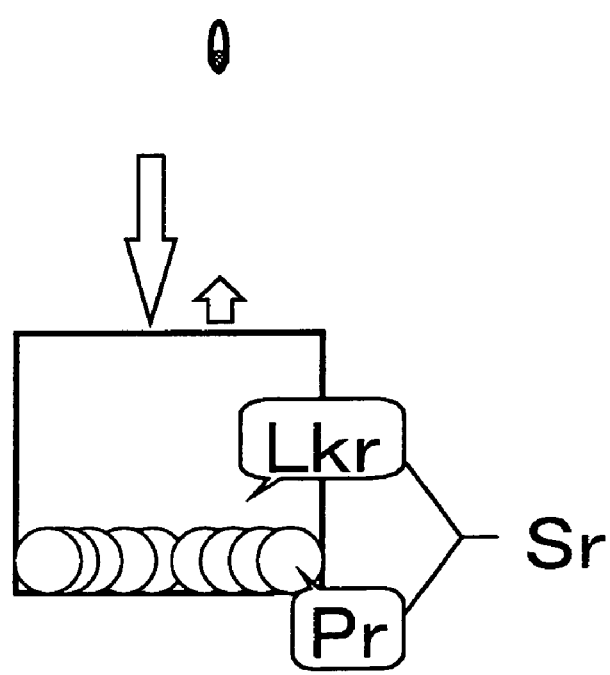
FIG. 16 is a sectional view of the electrophoretic display cell according to the embodiment of the present invention, in which red electrophoretic particles are combined with a colored dispersion medium made so as to absorb at least a component of red, when displaying darkly.

FIGS. 15 and 16 show sectional views of a cell for display of red (R). For the sake of simplified explanation, constituents such as electrodes and a bulkhead are omitted from being depicted. Electrophoretic particles Pr have a characteristic of reflecting the component of red (R). A dispersion medium (Lkr) is colored so as to absorb at least a wavelength component of the red (R). When applied voltage causes the electrophoretic particles Pr to migrate to an electrode located at the user side, a state shown in FIG. 15 is realized. In this case, the electrophoretic particles Pr can be seen directly by the user, where a bright red is displayed. On the other hand, when the electrophoretic particles migrate to the electrode opposite to the user, a state shown in FIG. 16 is provided. In this case, the cell is displayed in a dark red or black, because the incidence light experiences the absorption of the colored dispersion medium (Lkr). Although the cell is depicted to have a rectangular section, its shape is not limited to a rectangle, but any shape of the section can be applied to the present invention. An intention of the present invention is combinations of colors of dispersion.

Figure 17:
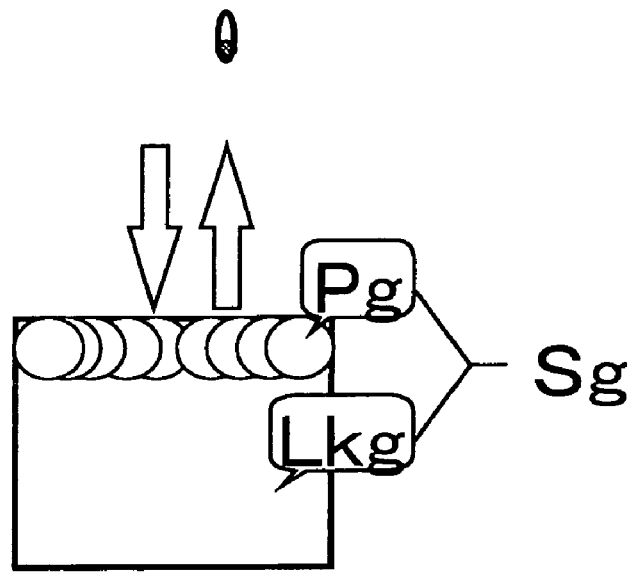
FIG. 17 is a sectional view of an electrophoretic display cell according to another embodiment of the present invention, in which green electrophoretic particles are combined with a colored dispersion medium made so as to absorb at least a component of green, when displaying brightly.
Figure 18:
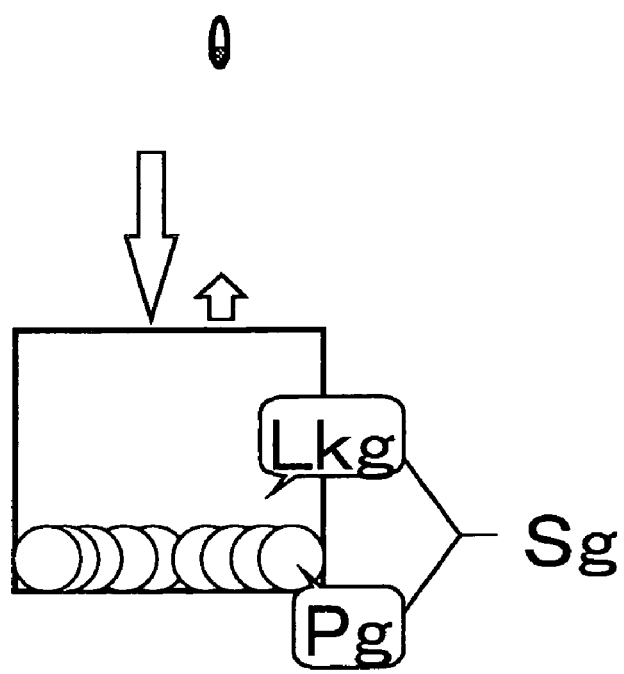
FIG. 18 is a sectional view of the electrophoretic display cell according to the embodiment of the present invention, in which green electrophoretic particles are combined with a colored dispersion medium made so as to absorb at least a component of green, when displaying darkly.

FIGS. 17 and 18 show sectional views of a cell for display of green (G). For the sake of simplified explanation, constituents such as electrodes and a bulkhead are omitted from being depicted. Electrophoretic particles Pg have a characteristic of reflecting a wavelength component of green (G). A colored dispersion medium (Lkg) is colored so as to absorb at least the component of the green (G). When applied voltage causes the electrophoretic particles Pg to migrate to an electrode located at the user side, a state shown in FIG. 17 is realized. In this case, the electrophoretic particles Pg can be seen directly by the user, where a bright green is displayed. On the other hand, when the electrophoretic particles migrate to the electrode opposite to the user, a state shown in FIG. 18 is provided. In this case, the cell is displayed in a dark green or black, because the incidence light experiences the absorption of the colored dispersion medium (Lkg).

Figure 19:
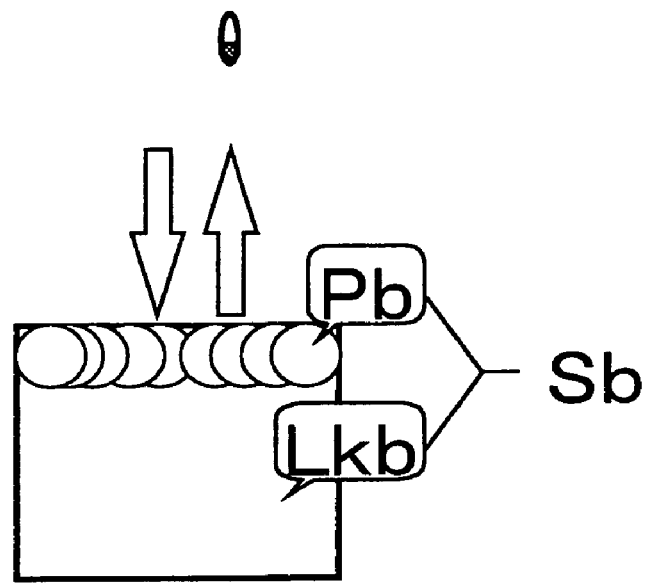
FIG. 19 is a sectional view of an electrophoretic display cell according to another embodiment of the present invention, in which blue electrophoretic particles are combined with a colored dispersion medium made so as to absorb at least a component of blue, when displaying brightly.
Figure 20:
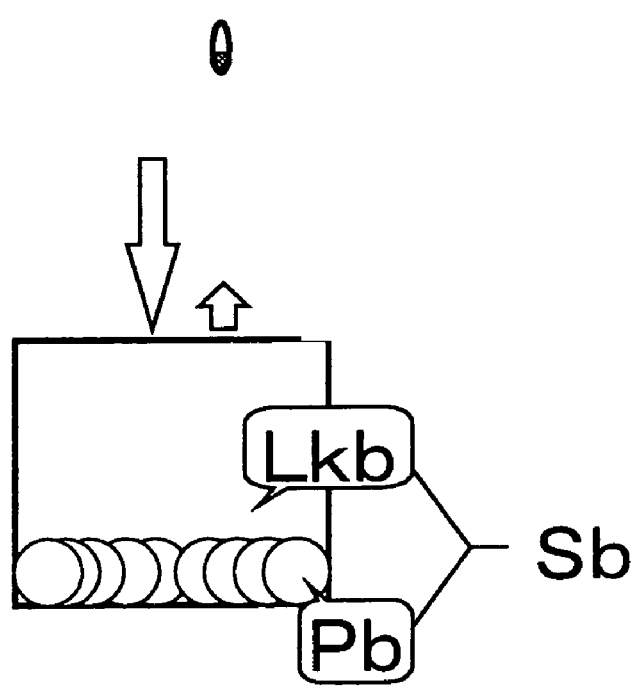
FIG. 20 is a sectional view of the electrophoretic display cell according to the embodiment of the present invention, in which blue electrophoretic particles are combined with a colored dispersion medium made so as to absorb at least a component of blue, when displaying darkly.

FIGS. 19 and 20 show sectional views of a cell for display of blue (B). For the sake of simplified explanation, constituents such as electrodes and a bulkhead are omitted from being depicted. Electrophoretic particles Pb have a characteristic of reflecting a wavelength component of blue (B). A dispersion medium (Lkb) is colored so as to absorb at least the component of the blue (B). When applied voltage causes the electrophoretic particles Pb to migrate to an electrode located at the user side, a state shown in FIG. 19 is realized. In this case, the electrophoretic particles Pb can be seen directly by the user, where a bright blue is displayed. On the other hand, when the electrophoretic particles migrate to the electrode opposite to the user, a state shown in FIG. 20 is provided. In this case, the cell is displayed in a dark blue or black, because the incidence light experiences the absorption of the colored dispersion medium (Lkb).

Therefore, using both the electrophoretic particles of the three primary colors (RGB) and a colored dispersion medium colored to absorb at least designated one of the three primary colors enables the cells to have high intensity of color and high contrast, with both of the color density and the cell thickness kept to their minimums. Further, since the cell can be formed into a thinner one, the intensity of an electric field required for electrophoresis can be realized by lower applied voltage than the conventional voltage. Hence the voltage to drive the cell can be lowered markedly. Further, the thinner cell makes it possible to switch the cell ON/OFF at higher speed, which leads to display of dynamic images identical or superior to or than that performed with liquid crystal display.

D. Fourth Embodiment

Figure 21:
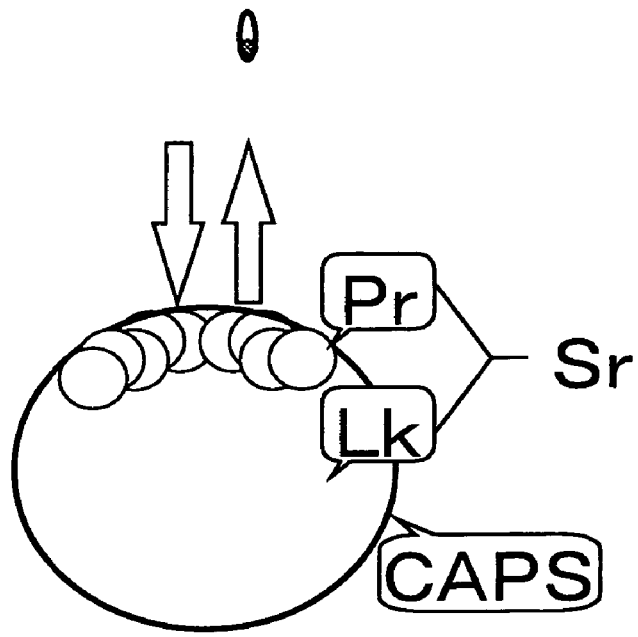
FIG. 21 is a sectional view of an electrophoretic display microcapsule according to another embodiment of the present invention, in which red electrophoretic particles are combined with a black-colored dispersion medium, when displaying brightly.
Figure 22:
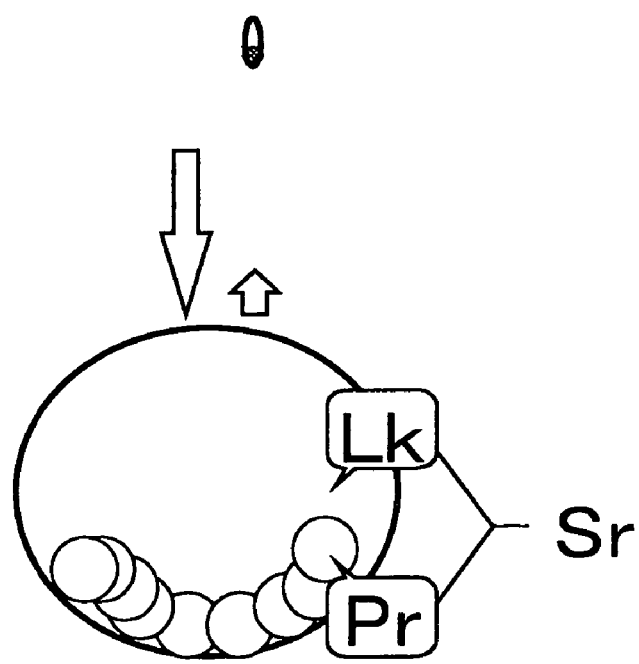
FIG. 22 is a sectional view of the electrophoretic display microcapsule according to another embodiment of the present invention, in which red electrophoretic particles are combined with a black-colored dispersion medium, when displaying darkly.

FIGS. 21 and 22 show sectional views of a microcapsule (CAPS) for display of red (R). For the sake of simplified explanation, constituents such as electrodes and a bulkhead are omitted from being depicted. When applied voltage causes the electrophoretic particles Pr to migrate to an electrode located at the user side, a state shown in FIG. 21 is realized. In this case, the electrophoretic particles Pr can be seen directly by the user, where a bright red is displayed. On the other hand, when the electrophoretic particles migrate to the electrode opposite to the user, a state shown in FIG. 22 is provided. In this case, the cell is displayed in a dark red or black, because the incidence light experiences the absorption of the colored dispersion medium (Lk). Although the microcapsule is depicted to have a circular section, its shape is not limited to a circle, but any shape of the section can be applied to the present invention. An intention of the present invention is combinations of colors of dispersion.

For displaying the green (G) or blue (B), the constituents of the microcapsule may be selected in a similar manner to the foregoing first to third embodiments.

Therefore, using both electrophoretic particles of the three primary colors (RGB) and a dispersion medium colored black, a complementary colored dispersion medium, or a colored dispersion medium colored to absorb at least designated one of the three primary colors enables the cells to have high intensity of color and high contrast, with both of the color density and the microcapsule size kept to their minimums. Further, since the microcapsule can be formed into a compact one, the intensity of an electric field required for electrophoresis can be realized by lower applied voltage than the conventional voltage. Hence the voltage to drive the microcapsule can be lowered markedly. Further, the compact microcapsule makes it possible to switch the microcapsule ON/OFF at higher speed, which leads to display of dynamic images identical or superior to or than that performed with liquid crystal display.

E. Fifth Embodiment

Figure 23:
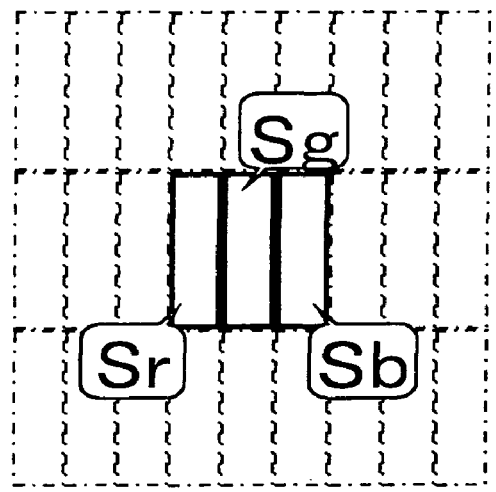
FIG. 23 is a plan view of a full-color electrophoretic display apparatus in which RGB display cells according to another embodiment of the present invention are juxtaposed.

FIG. 23 is a plan view showing a plurality of juxtaposed RGB cells. The three types of dispersion Sr, Sg and Sb described by the foregoing first to third embodiments are juxtaposed to compose one pixel. An actual cell needs constituents, such as driving elements and driving electrodes, to send signals of pixel information, but those constituents are omitted from being drawn, so that the illustration is simplified. This embodiment adopts the RGB cells arranged side by side, but those cells may be arranged in a delta shape or others. In the present invention, how to arrange the cells is not restricted, so that the three primary colors may be arranged in any form. In FIG. 23, dashed lines exhibit pixels, which are continuously arranged. Each of the cells CELL (R), CELL (G) and CELL (B) is composed by the dispersion described in the foregoing first, second or third embodiment. Hence, arbitrary switching control of the RGB cells enables display in the full colors.

Therefore, juxtaposing the cells each of which uses both electrophoretic particles of the three primary colors (RGB) and a dispersion medium colored black, a complementary colored dispersion medium, or a colored dispersion medium colored to absorb at least designated one of the three primary colors enables the cells to have high intensity of color and high contrast, with both of the color density and the cell thickness kept to their minimums. Further, the voltage to drive the cell can be lowered markedly. Further, the thinner cell makes it possible to switch the cell ON/OFF at higher speed, which leads to display of dynamic images identical or superior to or than that performed with liquid crystal display.

If using multi-colors, any two colors are selectable and combined with each other.

F. Sixth Embodiment

Figure 24:
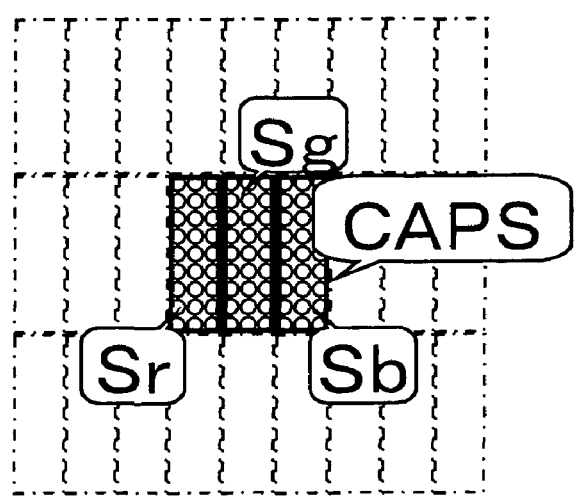
FIG. 24 is a plan view of a full-color electrophoretic display apparatus in which electrophoretic display microcapsules according to another embodiment of the present invention are juxtaposed in RGB display cells.

FIG. 24 is a plan view showing a plurality of juxtaposed RGB cells. The three types of dispersion Sr, Sg and Sb described by the foregoing first to third embodiments are individually filled into a microcapsule CAPS and a plurality of microcapsules of the same color are formed into each cell CELL (R), CELL (G) or CELL (B). The three cells are juxtaposed to form one pixel. Actual cells need constituents, such as driving elements and driving electrodes, to send signals of pixel information, but those constituents are omitted from being drawn, so that the illustration is simplified. For the sake of a further simplified illustration, structural members including binder to secure the capsule are also omitted from being depicted. This embodiment adopts the RGB cells arranged side by side, but those cells may be arranged in a delta shape or others. In the present invention, how to arrange the cells is not restricted, so that the three primary colors may be arranged in any form. In FIG. 24, dashed lines exhibit pixels, which are continuously arranged. The microcapsule CAPS included by each of the cells CELL (R), CELL (G) and CELL (B) is composed by the dispersion described in the foregoing first, second or third embodiment. Hence, arbitrary switching control of the RGB cells enables display in the full colors. Therefore, juxtaposing the microcapsules each of which uses both electrophoretic particles of the three primary colors (RGB) and a dispersion medium colored black, a complementary colored dispersion medium, or a colored dispersion medium colored to absorb at least designated one of the three primary colors enables the cells to have high intensity of color and high contrast, with both of the color density and the cell thickness kept to their minimums. Further, the voltage to drive the cell can be lowered markedly. Further, the thinner cell makes it possible to switch the cell ON/OFF at higher speed, which leads to display of dynamic images identical or superior to or than that performed with liquid crystal display. If using multi-colors, any two colors are selectable and combined with each other.

G. Seventh Embodiment

Figure 25:
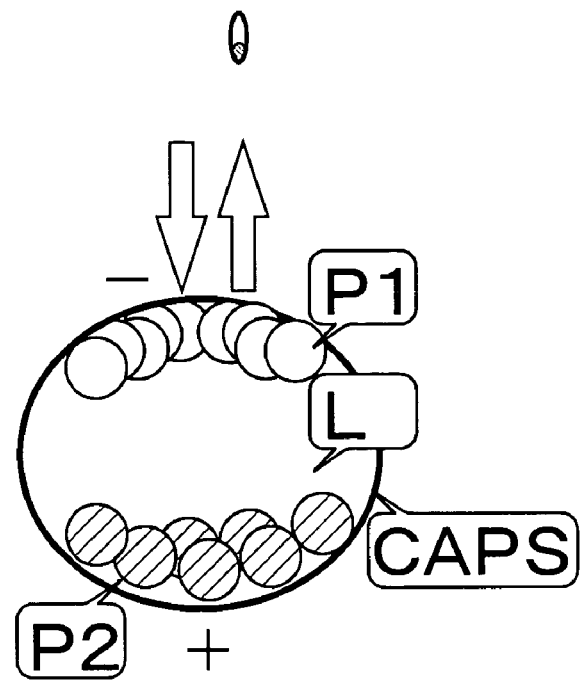
FIG. 25 is a sectional view of an electrophoretic display microcapsule according to another embodiment of the present invention, where a microcapsule contains two types of electrophoretic particles.
Figure 26:
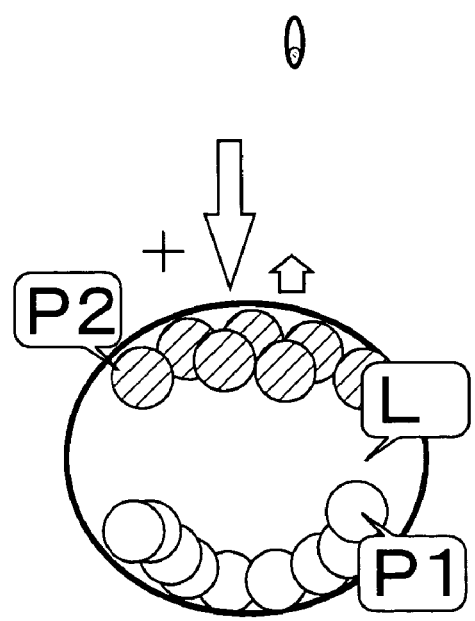
FIG. 26 is a sectional view of the electrophoretic display microcapsule according to another embodiment of the present invention, where a microcapsule contains two types of electrophoretic particles.

FIGS. 25 and 26 show sectional views of a microcapsule (CAPS) which contains two types of electrophoresis particles. In an actual product, a plurality of microcapsules make up a display panel. However, to make the explanation simpler, FIGS. 25 and 26 show only one microcapsule. Also, other parts of the display panel such as electrodes or binders are not shown in FIGS. 25 and 26. As shown in FIGS. 25 and 26, the microcapsule contains a dispersion medium L, a first electrophoresis particle P1, and a second electrophoresis particle P2. The electrophoresis particle P1 carries a positive charge, and the second electrophoresis particle P2 carries a negative charge. Also, the relation of the colors between the first electrophoresis particle P1 and the second electrophoresis particle P2 is complementary color. Namely, when the color of the first electrophoresis particle P1 is red (R), the color of the second electrophoresis particle P2 is cyan (C); when the color of the first electrophoresis particle P1 is green (G), the color of the second electrophoresis particle P2 is magenta (M); when the color of the first electrophoresis particle P1 is blue (B), the color of the second electrophoresis particle P2 is yellow (Y). The dispersion medium L is transparent.

When negative voltage is applied to an electrode (not shown) located at the user side (the eyes shown in FIGS. 25 and 26 indicate the user's eyes), the first electrophoresis particle P1 migrates to the electrode at the user side, and the second electrophoresis particle P2 migrates to the other side as shown in FIG. 25. By this, the color of the electrophoresis P1 can be seen by the user. On the other hand, when positive voltage is applied to an electrode (not shown) located at the user side, the second electrophoresis particle P2 migrates to the electrode at the user side, and the first electrophoresis particle P1 migrates to the other side as shown in FIG. 26. By this, the color of the electrophoresis P2 can be seen by the user.

Using the relationship of the complementary color between the first electrophoresis particle and the second electrophoresis particle, it becomes possible to obtain excellent color purity and high contrast even when the colored densities of the first electrophoresis particle and the second electrophoresis particle are minimum and the cell thickness is minimum. Also, in the same manner as the sixth embodiment, it is possible to realize full color. That is, as shown in FIG. 24, microcapsules according to this embodiment are put in cells based on their colors of red (G), green (G), and blue (B), and three cells of RGB form one pixel for full color.

What is claimed is:

1. An electrooptical device comprising:
a plurality of pixel elements, each of the pixel elements including an electrooptical layer disposed between electrodes,
the electrooptical layer of each pixel element including a first cell and a second cell each containing a dispersion medium, and electrophoretic particles suspended in the dispersion medium, with a multicolor display being provided by driving the first cell and the second cell within each of the pixel elements,
the electrophoretic particles in the first cell being colored a first color so as to reflect the first color to reach a viewer and the electropheretic particles in the second cell being colored a second color so as to reflect the second color to reach the viewer, the first color being different from a second color, each of the electropheretic particles being colored only one color,
the dispersion medium included in the first cell being colored so as to absorb the first color and the dispersion medium in the second cell being colored so as to absorb the second color, and
the first cell displaying the first color in a brightness that corresponds with electrophoretic migration of the electrophoretic particles in the dispersion medium of the first cell, and the second cell displaying the second color in a brightness that corresponds with electrophoretic migration of the electrophoretic particles in the dispersion medium of the second cell.

2. The electrooptical device of claim 1, wherein the first color and the second color include red, green, and blue.

3. The electrooptical device of claim 1, wherein the dispersion medium included in each cell is substantially colored black.

4. The electrooptical device of claim 1, wherein the dispersion particles included in each cell is colored so as to be complementary to the particles included in the dispersion medium of the each cell.

5. The electrooptical device of claim 1, wherein the particles included in each of the first and second cells are of a single color.

6. An electro-optical device comprising:
an electro-optical layer between electrodes,
the electro-optical layer including a first cell and a second cell each containing a dispersion medium, and particles contained in the dispersion medium,
the particles being colored a first color so as to reflect a color to be reached to a viewer, each of the particles being colored only one color,
the dispersion medium being colored a color so as to absorb the first color, and
the first cell displaying the first color in a brightness that corresponds with electrophoretic migration of the electrophoretic particles in the dispersion medium of the first cell, and the second cell displaying a second color in a brightness that corresponds with electrophoretic migration of the electrophoretic particles in the dispersion medium of the second cell.

7. The electro-optical device of claim 6, the first color being selected from a group including red, green and blue.

8. The electro-optical device of claim 7, the second color being selected from a group including cyan, magenta and yellow.

9. The electro-optical device of claim 6, the second color being substantially black.

10. An electrooptical device comprising:
a plurality of pixel elements, each of the pixel elements including an electrooptical layer disposed between electrodes,
the electrooptical layer of each pixel element including a first cell and a second cell each containing a dispersion medium, and electropheretic particles suspended in the dispersion medium, with a multicolor display being provided by driving the first cell and the second cell within each of the pixel elements,
the electropheretic particles in the first cell being colored a first color so as to reflect the first color to reach a viewer and the electropheretic particles in the second cell being colored a second color so as to reflect the second color to reach the viewer, the first color being different from a second color, each of the electropheretic particles being colored only one color, the dispersion medium included in the first cell being colored so as to absorb the first color and the dispersion medium in the second cell being colored so as to absorb the second color, and the first color reflected by the electrophoretic particles in the first cell passing through the dispersion medium and being displayed, the second color reflected by the electrophoretic particles in the second cell passing through the dispersion medium and being displayed.

11. An electro-optical device comprising:

an electro-optical layer between electrodes, the electro-optical layer including a first cell and second cell each containing a dispersion medium, and particles contained in the dispersion medium, the particles being colored a first color so as to reflect a color to be reached to a viewer, each of the particles being colored only one color, the dispersion medium being colored a color so as to absorb the first color, and the first color reflected by the electrophoretic particles in the first cell passing through the dispersion medium and being displayed, a second color reflected by the electrophoretic particles in the second cell passing through the dispersion medium and being displayed.

12. An electrooptical device comprising:

a plurality of pixel elements, each of the pixel elements including an electrooptical layer disposed between electrodes, the optical layer in each pixel including:

a first cell including a first dispersion medium and first particles dispersed in the first dispersion medium, the first dispersion medium being colored cyan for absorbing a red wavelength component and the first particles being colored red, the first cell displaying colors from black to red by controlling electrophoretic migration of the first particles to control amount of the red wavelength component absorbed by the first dispersion medium;

a second cell including a second dispersion medium and second particles dispersed in the second dispersion medium, the second dispersion medium being colored magenta for absorbing a green wavelength component and the second particles being colored green, the second cell displaying colors from black to green by controlling electrophoretic migration of the second particles to control amount of the red wavelength component absorbed by the second dispersion medium; and a third cell including a third dispersion medium and third particles dispersed in the third dispersion medium, the third dispersion medium being colored yellow for absorbing a blue wavelength component and the third particles being colored blue, the third cell displaying colors from black to blue by controlling electrophoretic migration of the third particles to control amount of the red wavelength component absorbed by the third dispersion medium.

13. An electrooptical device comprising:

a plurality of pixel elements, each of the pixel elements including an electrooptical layer disposed between electrodes, the optical layer in each pixel including:

a first cell including a black dispersion medium and first particles dispersed in the black dispersion medium, the black dispersion medium being colored black and the first particles being colored red, the first cell displaying colors from black to red by controlling electrophoretic migration of the first particles to control amount of the red wavelength component absorbed by the black dispersion medium;

a second cell including the black dispersion medium and second particles dispersed in the black dispersion medium, the second particles being colored green, the second cell displaying colors from black to green by controlling electrophoretic migration of the second particles to control amount of the red wavelength component absorbed by the black dispersion medium; and a third cell including the black dispersion medium and third particles dispersed in the black dispersion medium, the third particles being colored blue, the third cell displaying colors from black to blue by controlling electrophoretic migration of the third particles to control amount of the red wavelength component absorbed by the black dispersion medium.

* * * * *